(12) United States Patent
Yu

(10) Patent No.: US 7,729,294 B2
(45) Date of Patent: Jun. 1, 2010

(54) METHOD FOR DISCOVERING NETWORK DEVICE

(75) Inventor: Ming Hsien Yu, Sijhih (TW)

(73) Assignee: Cameo Communications, Inc. (TW)

( * ) Notice: Subject to any disclaimer, the term of this patent is extended or adjusted under 35 U.S.C. 154(b) by 362 days.

(21) Appl. No.: 11/790,304

(22) Filed: Apr. 24, 2007

(65) Prior Publication Data
US 2008/0089244 A1 Apr. 17, 2008

(30) Foreign Application Priority Data
Dec. 10, 2006 (TW) .............................. 95146185 A

(51) Int. Cl.
*H04L 12/28* (2006.01)
*H04L 12/56* (2006.01)
(52) U.S. Cl. ...................... 370/255; 370/389
(58) Field of Classification Search ....................... None
See application file for complete search history.

(56) References Cited

U.S. PATENT DOCUMENTS 5,796,736 A * 8/1998 Suzuki ....................... 370/254
2005/0132026 A1 * 6/2005 Govil ......................... 709/220
2007/0195824 A9 * 8/2007 Chapman et al. ............ 370/490

* cited by examiner

*Primary Examiner*—Gregory B Sefcheck
*Assistant Examiner*—Nima Mahmoudzadeh

(57) ABSTRACT

A method for discovering a network device is disclosed for executing a discovery procedure of the network device in a Data Link Layer (i.e. Layer 2 of OSI 7 Layers Model) via a Network Management Server (NMS) within a Local Area Network (LAN) system to discover other network devices within the LAN. Firstly, sending a discovery packet from a Network Management Server (NMS), wherein the discovery packet comprises a command for requesting the network device to send back a corresponding Media Access Control (MAC) address. Then, receiving the discovery packet by at least one of the network device, and generating a response packet corresponding to the discovery packet for sending the response packet, wherein the response packet comprises the Media Access Control (MAC) address of the network device. Then, receiving the response packet from the NMS for collecting the MAC address while ignoring an IP address in the response packet, and updating a device information table according to the MAC address for identifying the network device.

15 Claims, 8 Drawing Sheets

METHOD FOR DISCOVERING NETWORK DEVICE

BACKGROUND OF INVENTION

1. Field of the Invention

The present invention relates to a method for discovering a network device, and more particularly to a method for executing a discovery procedure in a Data Link Layer (i.e. Layer 2) via a Network Management Server (NMS) within a Local Area Network (LAN) system to discover other network devices within the LAN.

2. Description of the Prior Art

Presently, due to people needing portability from their electronic information apparatus and the real-time transmission of electronic information, various network communication functions have become one of the prerequisites when a consumer wants to buy an electronic information apparatus. For a communication system of Local Area Network (LAN), it is important for manufacturers to develop how to discover and identify various network devices in a network system to manage the network devices.

Nowadays, a traditional method for discovering a network device in a traditional wired or wireless network system is generally provided with a Network Management Server (NMS) for executing a discovery procedure in a Layer 3 (i.e. a network layer) of an Open System Interconnection 7-Layer Model (i.e. OSI 7 Layers Model) in order to discover all network devices which are normally working in the network system. In the traditional method, all of the network devices must firstly obtain only one effective IP address from a Dynamic Host Configuration Protocol (DHCP) server, and then define the IP address as an identification. After this, the NMS broadcasts a discovery packet. Once any one of the network devices in the network system receives the discovery packet, said network device will send a response packet including corresponding information, such as a corresponding IP address, back to the NMS. Therefore, the NMS will identify the identification of each of the network devices according to the information, such as the IP address, included in the response packet for the purpose of managing the network devices.

However, the traditional method for discovering the network device as described above still has the following disadvantages:

(1) In the traditional method, all of the network devices must firstly obtain only one effective IP address corresponding to each of the network devices before starting the discovery procedure. In other words, if one of the network devices can not obtain its corresponding IP address in advance, the discovery procedure will not be executed.

(2) In the traditional method, a DHCP server is essential in the network system in order to obtain only one effective IP address, so as to increase additional hardware cost and inevitably expand corresponding software and network framework, wherein the additional hardware cost is only used for the purpose of allocating IP addresses. For some compact network device only having limited operation ability and hardware support, it is relatively inefficient to execute an IP address processing procedure, even though the compact network device is unsuitable to execute the traditional method.

(3) Most of the network devices are pre-set with a predetermined default IP address after fabrication, and the network devices fabricated by the same manufacturer (even different manufacturers) are generally pre-set with the same predetermined default IP address. If two or more network devices having the same predetermined IP address are discovered in a discovery procedure, the NMS will be confused so that the network system may be instable, or need to be additionally noticed and adjusted by a network administrator.

In addition to the traditional method for discovering a network device as described above, there is still a traditional method for executing a discovery procedure of a network device by using a superior layer of a network layer communication protocol or by using more complicated packet content, wherein the later traditional method is not only complicated, but also basically has the same or similar disadvantages as that of the former traditional method as described above, which defines the IP address as an identification of the network device.

Furthermore, although there is a further conventional method for detecting a network device via a Media Access Control (MAC) address of the network device, such as the communication protocol of Operations And Maintenance (OAM), the conventional method is only used to detect or test the operation of the network device, but not to execute a discovery procedure.

It is therefore tried by the inventor to develop a method for discovering a network device to solve the problems existing in the traditional method as described above.

SUMMARY OF INVENTION

A primary object of the present invention is to provide a method for discovering a network device, wherein the network device can successfully and correctly execute a discovery procedure without obtaining only one effective IP address in advance, so as to lower the hardware and software costs of the network device, and enhance the execution efficiency of the discovery procedure.

A secondary object of the present invention is to provide a method for discovering a network device, wherein a Network Management Server (NMS) is used to execute a discovery procedure in a Data Link Layer (i.e. Layer 2) and define a MAC address of the network device as an identification thereof in place of an IP address, so as to discover and identify other network devices in a network system.

In order to achieve the above mentioned objects, a method for discovering a network device is disclosed for executing a discovery procedure of the network device in a Data Link Layer (i.e. Layer 2 of OSI 7 Layers Model) via a Network Management Server (NMS) within a Local Area Network (LAN) system to discover other network devices within the LAN. Firstly, sending a discovery packet from a Network Management Server (NMS), wherein the discovery packet comprises a command for requesting the network device to send back a corresponding Media Access Control (MAC) address. Then, receiving the discovery packet by at least one of the network device, and generating a response packet corresponding to the discovery packet for sending the response packet, wherein the response packet comprises the Media Access Control (MAC) address of the network device. Then, receiving the response packet from the NMS for collecting the MAC address while ignoring an IP address in the response packet, and updating a device information table according to the MAC address for identifying the network device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 1:
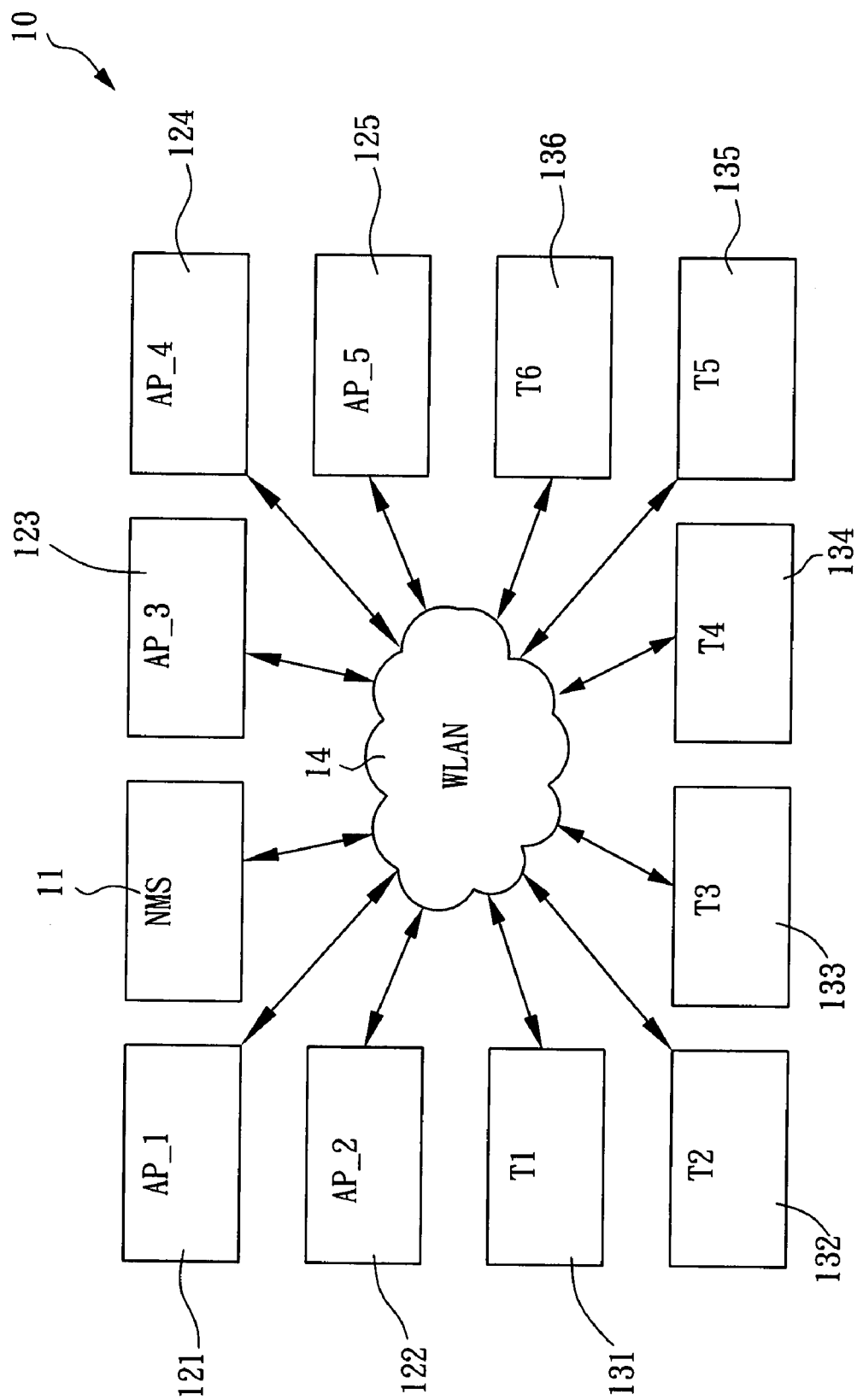
FIG. 1 is a system block diagram of a wireless network system according to a method for discovering a network device in a preferred embodiment of the present invention.

Referring now to FIG. 1, a system block diagram of a method for discovering a network device applied to a wireless network system according to a preferred embodiment of the present invention is illustrated. As shown, the wireless network system designated by numeral 10 comprises at least one Network Management Server (NMS) 11, at least one Access Point 121-125 (i.e. AP1-AP5), and at least one terminal device 131-136 (i.e. T1-T6). The NMS 11, the access points 121-125, and the terminal devices 131-136 are interconnected to each other via a wireless network environment 14, such as a system selected from Wireless Local Access Network (WLAN) under an Ethernet framework, Global System for Mobile Communication (GSM), General Packet Radio Service (GPRS), Code Division Multiple Access (CDMA), Ultra Wide Band (UWB), and etc., without limitation.

In the preferred embodiment of the present invention, the NMS 11 can be selected from an independent network device (not shown) in a hardware form, or in a software form built in one of the access points 121-125 or one of the terminal devices 131-136. The NMS 11 is mainly used to discover and manage the access points 121-125 and the terminal devices 131-136 for ensuring that the wireless network system 10 can normally operate. The access points 121-125 are used to receive connection requests and information transmission requests from terminal devices 131-136, and then execute corresponding information transmissions. The terminal devices 131-136 are devices for general users to access the Internet, and can be selected from computers, Personal Digital Assistants (PDAs), mobile phones, game players, network adapters, or other electronic information devices with a built-in wireless network receiver or an extended wireless network receiver, without limitation.

As shown in FIG. 1, the method for discovering the network device according to the preferred embodiment of the present invention is applied to the wireless network system 10. However, a method for discovering a network device according to an alternative preferred embodiment of the present invention may be applied to other feasible appliances. For example, in another aspect, a method for discovering a network device according to one preferred embodiment of the present invention may be applied to a traditional wired network system or a composite network system constructed by a wireless network and a wired network.

Figure 2:
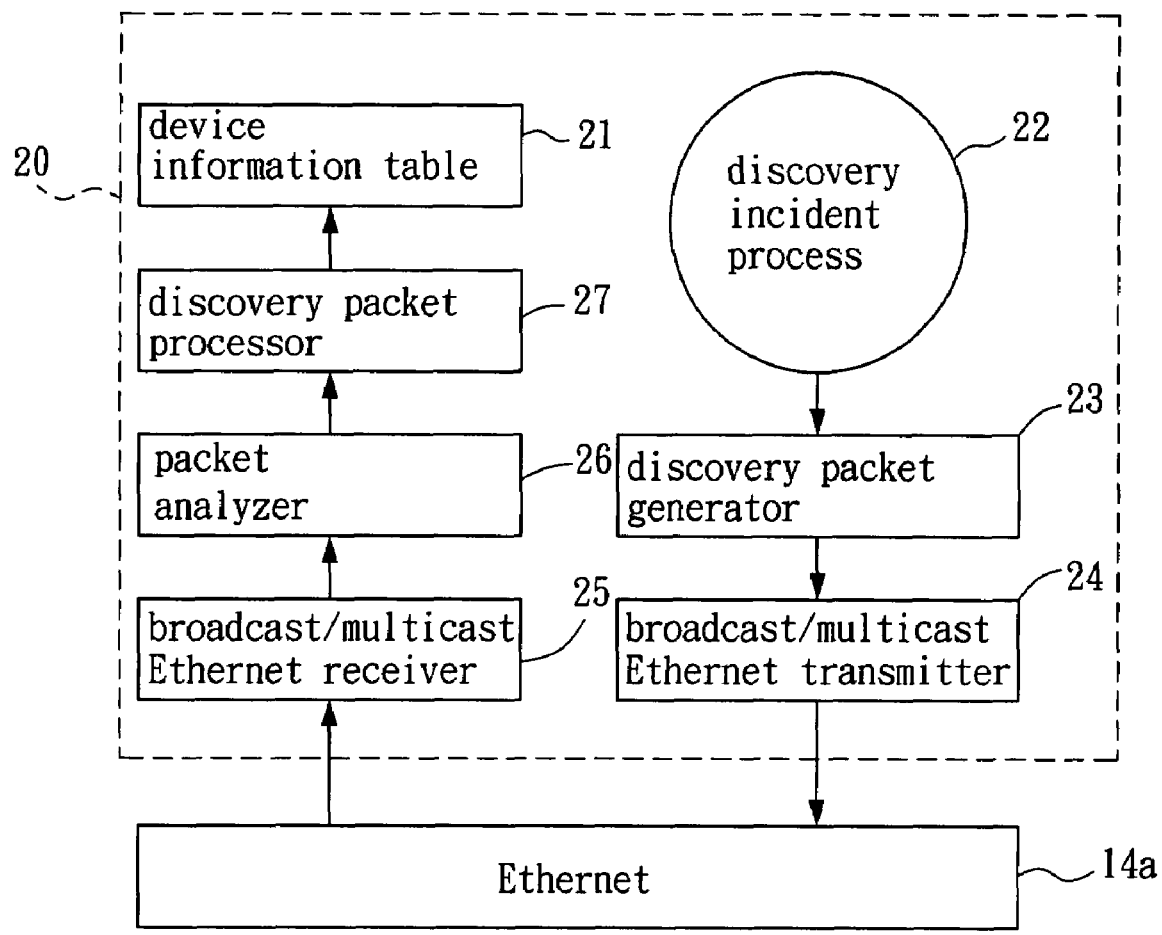
FIG. 2 is a block diagram of a Network Management Server (NMS) according to the method for discovering the network device in the preferred embodiment of the present invention.
Figure 3:
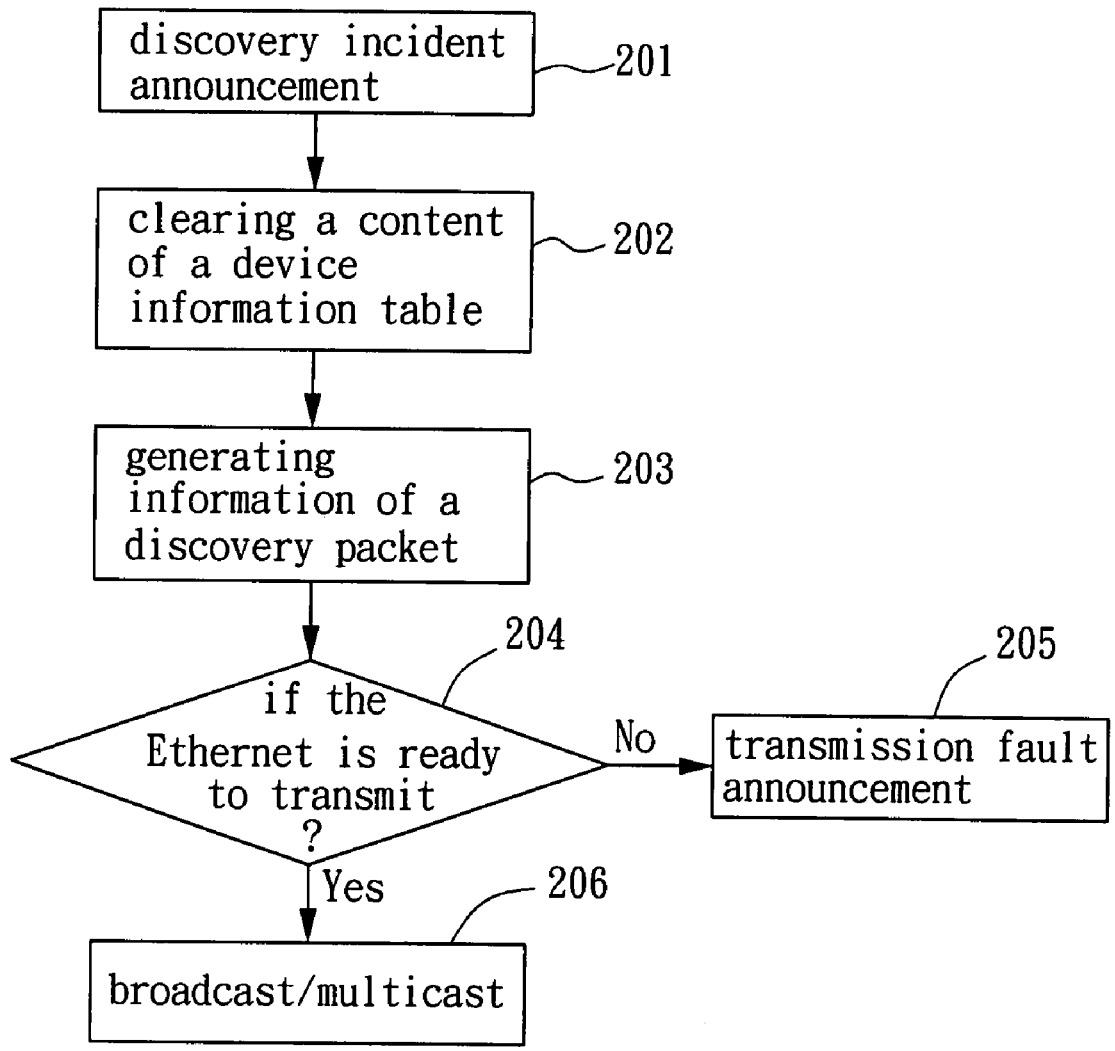
FIG. 3 is a flowchart of a discovery packet transmitted by the NMS according to the method for discovering the network device in the preferred embodiment of the present invention.
Figure 4:
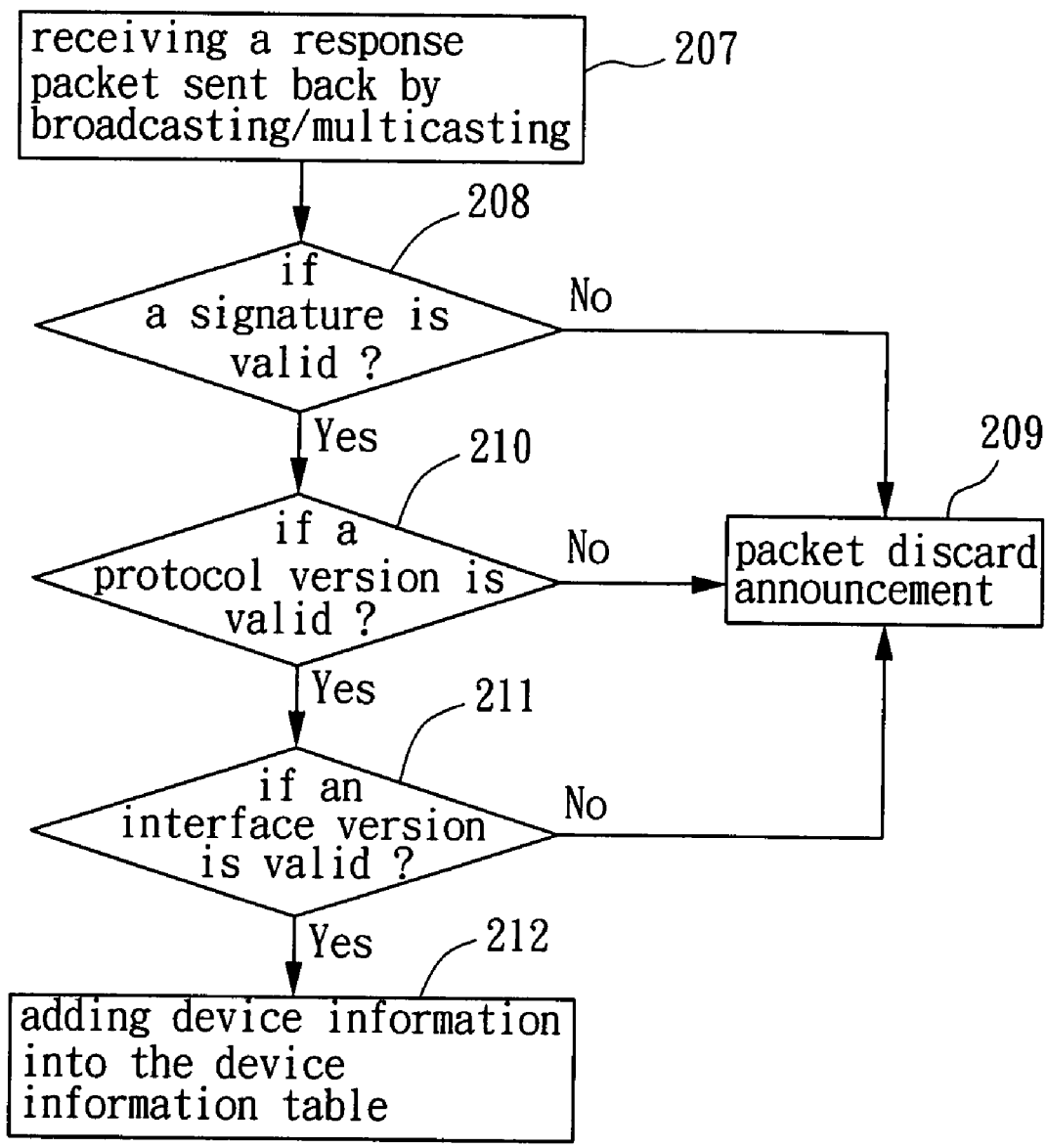
FIG. 4 is another flowchart of the discovery packet received by the NMS according to the method for discovering the network device in the preferred embodiment of the present invention.

Referring now to FIGS. 2, 3, and 4, according to the method for discovering the network device in the preferred embodiment of the present invention, a block diagram of a Network Management Server (NMS), a flowchart of a discovery packet transmitted by the NMS, and another flowchart of the discovery packet received by the NMS are respectively illustrated.

Referring still to FIG. 2, 3, and 4, the method for discovering the network device according to the preferred embodiment of the present invention is mainly provided with a NMS designated by numeral 20 to execute a discovery procedure in order to discover other network devices in a network system. As shown in FIGS. 2, 3, and 4, the operation flowchart of the NMS 20 comprises the following steps:

In step 201, starting a discovery procedure. The NMS 20 is provided with a discovery incident process 22 therein to construct a discovery incident announcement for starting the discovery procedure. In the preferred embodiment of the present invention, the discovery procedure is executed in a communication protocol of a MAC layer (i.e. a Data Link Layer which is a Layer 2 of OSI 7 Layers Model)

In step 202, clearing the content of a device information table 21 in the NMS 20.

In step 203, generating information of a discovery packet. The NMS 20 is provided with a discovery packet generator 23 therein to generate the discovery packet of the present invention, wherein the discovery packet comprises a command for requesting a network device to send back a corresponding MAC address and other device information.

In step 204, checking if the network system (such as an Ethernet 14a) is ready to transmit the discovery packet. If yes, go to step 206; if not, go to step 205 for generating a transmission fault announcement.

In step 206, transmitting the discovery packet. The NMS 20 is provided with a broadcast/multicast Ethernet transmitter 24 therein to transmit the discovery packet into the Ethernet 14a in a broadcast or multicast manner.

In step 207, receiving a response packet sent back by the broadcasting/multicasting. The NMS 20 is provided with a broadcast/multicast Ethernet receiver 25 therein to receive the response packet which is sent back by the network device corresponding to the discovery packet.

Then, the NMS 20 is provided with a packet analyzer 26 therein to analyze the response packet for collecting a MAC address in the response packet. Meanwhile, an IP address which may exist in the response packet is omitted. In the preferred embodiment of the present invention, the procedure of analyzing the response packet further comprises the following steps 208-211:

In step 208, checking if a signature is valid. The packet analyzer 26 is firstly used to check if the signature included in the response packet is valid. If yes, go to step 210; if not, go to step 209 for discarding the response packet and then generating a packet discard announcement.

In step 210, checking if a protocol version is valid. Then, the packet analyzer 26 is used to check if the protocol version of the response packet is valid. If yes, go to step 211; if not, go to step 209.

In step 211, checking if an interface version is valid. The packet analyzer 26 is further used to check if the interface version of the response packet is valid. If yes, go to step 212; if not, go to step 209.

In step 212, adding (or updating) said device information into the device information table 21. After the packet analyzer 26 confirms the steps 208-211 without any fault, the collected MAC address will be defined as an identification (ID). Furthermore, the NMS 20 is provided with a discovery packet processor 27 therein to store the MAC address of the network device and other device information included in the response packet into the content of the device information table 21 for the purpose of managing the network device in the following steps.

Figure 5:
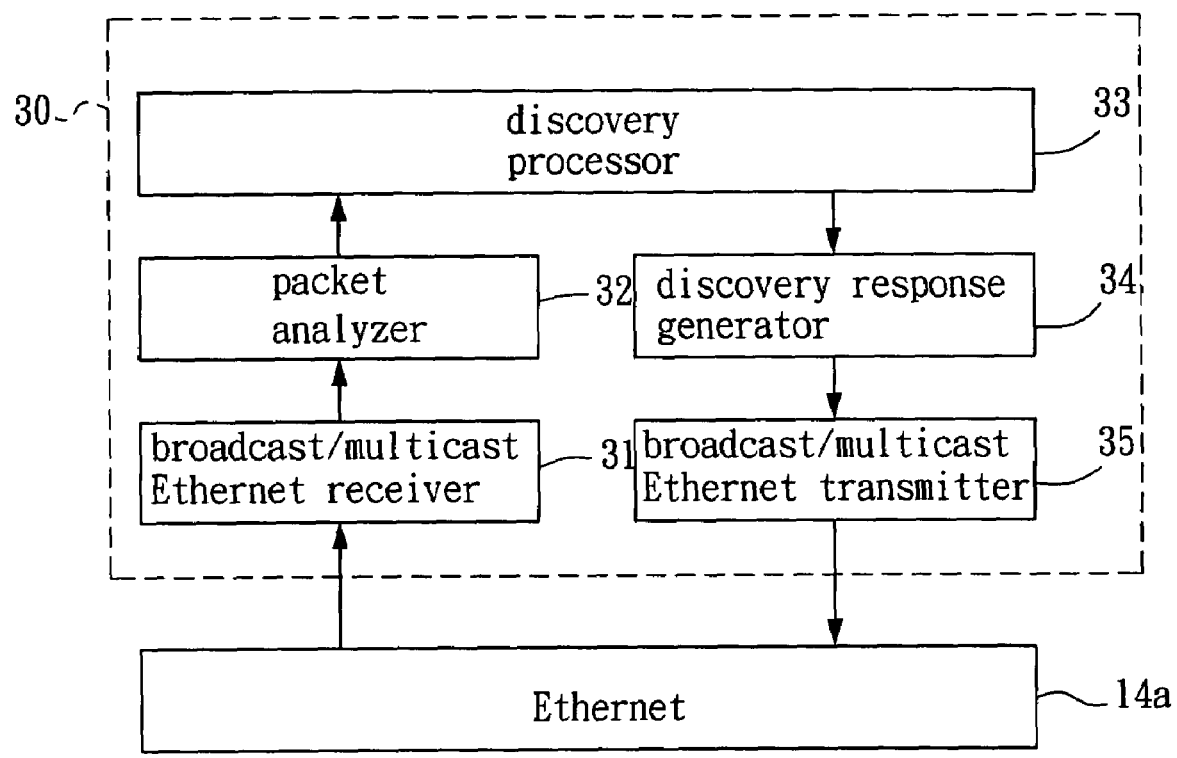
FIG. 5 is a block diagram of a network device according to the method for discovering the network device in the preferred embodiment of the present invention.
Figure 6:
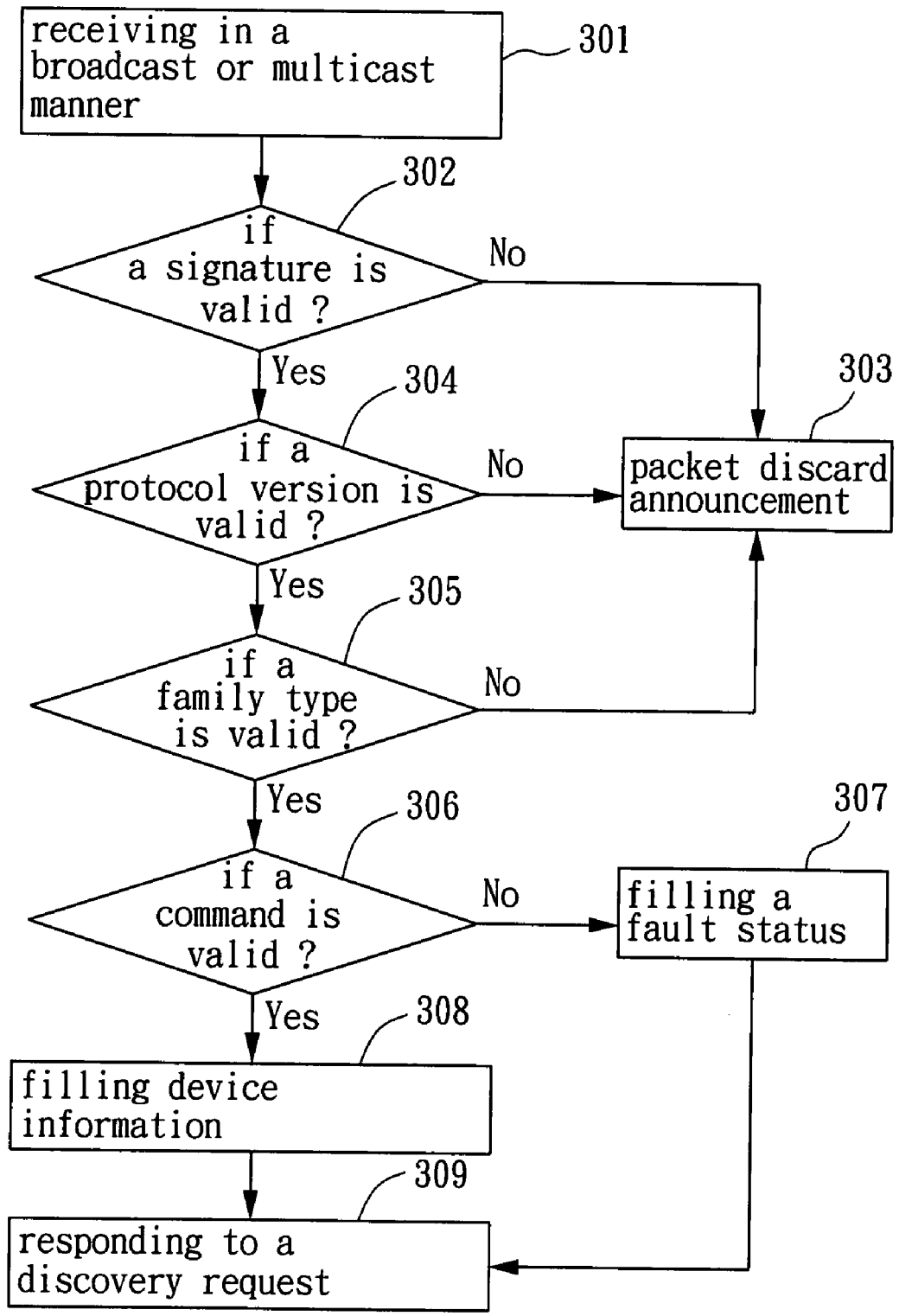
FIG. 6 is a flowchart of a response packet sent back by the network device according to the method for discovering the network device in the preferred embodiment of the present invention.

Referring now to FIG. 5 and 6, according to the method for discovering the network device in the preferred embodiment of the present invention, a block diagram of a network device and a flowchart of a response packet sent back by the network device are respectively illustrated. As shown, the operation flowchart of the network device designated by numeral 30 comprises the following steps:

In step 301, receiving the discovery packet in a broadcast or multicast manner. The network device 30 is provided with a broadcast/multicast Ethernet receiver 31 therein to receive the discovery packet transmitted from the Ethernet 14a.

Then, the network device 30 is provided with a packet analyzer 32 therein to analyze the discovery packet for collecting a command in the discovery packet, and then generating a response packet according to the command of the discovery packet. The response packet comprises the MAC address of the network device 30 and other device information. In the preferred embodiment of the present invention, the procedure of analyzing the response packet further comprises the following steps 302-307:

In step 302, checking if a signature is valid. The packet analyzer 32 is firstly used to check if the signature included in the discovery packet is valid. If yes, go to step 304; if not, go to step 303 for discarding the discovery packet and then generating a packet discard announcement.

In step 304, checking if a protocol version is valid. Then, the packet analyzer 32 is used to check if the protocol version of the discovery packet is valid. If yes, go to step 305; if not, go to step 303.

In step 305, checking if a family type is valid. The packet analyzer 32 is further used to check if the family type of the discovery packet is valid. If yes, go to step 306; if not, go to step 303.

In step 306, checking if a command is valid. The packet analyzer 32 is further used to check if the command of the discovery packet is valid. If yes, go to step 308; if not, go to step 307 for filling a fault status into the response packet and then go to step 309.

In step 308, filling said device information. The network device 30 is provided with a discovery processor 33 therein to transmit the MAC address of the network device 30 and other device information (which may comprise a predetermined default IP address) to a discovery response generator 34 according to the command included in the discovery packet, and then fill the MAC address and other device information into a response packet to finish the response packet.

In step 309, responding to a discovery request. The network device 30 is provided with a broadcast/multicast Ethernet transmitter 35 therein to send the response packet out of the Ethernet 14a.

Figure 7:
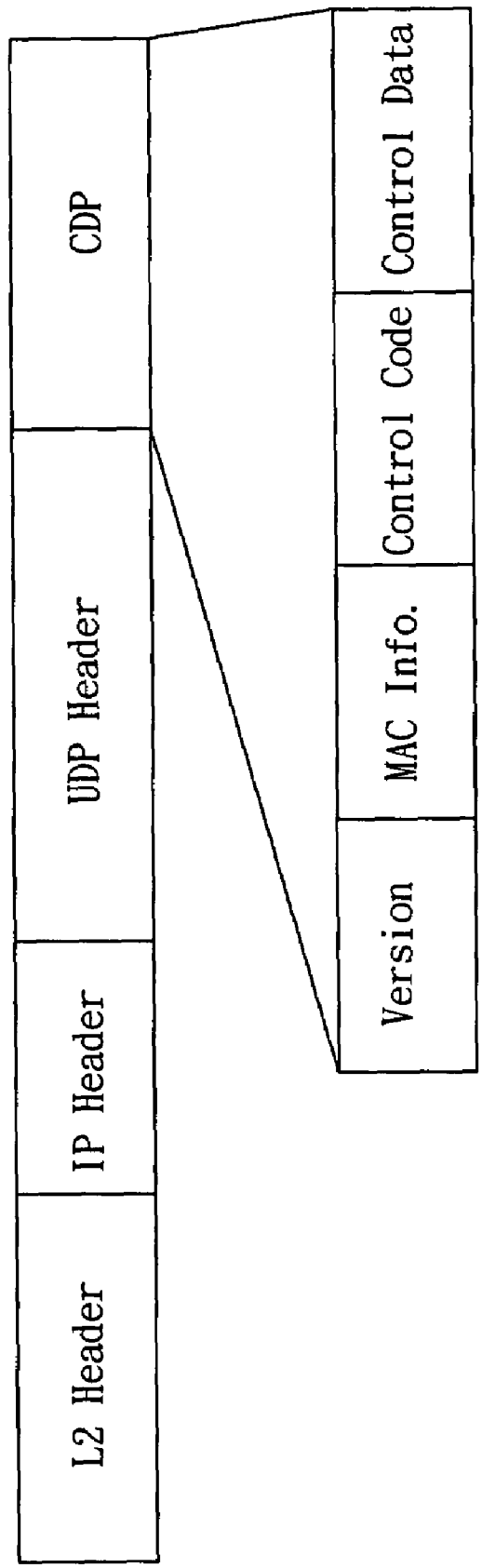
FIG. 7 is a schematic view of a content column included in the response packet according to the method for discovering the network device in the preferred embodiment of the present invention.

Referring now to FIG. 7, a schematic view of a content column included in the response packet according to the method for discovering the network device in the preferred embodiment of the present invention is illustrated. As shown, the content column of the response packet comprises a Data Link Layer (i.e. L2 or DLL) Header field, an IP header field, a User Datagram Protocol (UDP) header field, and a CDP field which is a characteristic of the present invention, wherein the CDP field further comprises a version field, a MAC information field, a control code field, and a control data field. The version field is used to disclose a protocol version or an interface version of the network device. The MAC information field is used to disclose the MAC address of the network device. The IP header field is used to store the IP address of the network device. In the preferred embodiment of the present invention, the IP address will not be used as the identification of the network device, so as to allow that the IP address of the network device can be any predetermined default IP address, even the same as that of any other network devices. Moreover, according to the method for discovering the network device in the preferred embodiment of the present invention, a User Datagram Protocol (UDP) is used as a transmission protocol for providing a higher transmission speed.

After the NMS of the present invention discovers and obtains the MAC address of each of the network device and other device information according to the method for discovering the network device as described above, the NMS further manages each of the network device according to said obtained information for maintaining the operation efficiency of the network system, such as the wireless network system.

Figure 8:
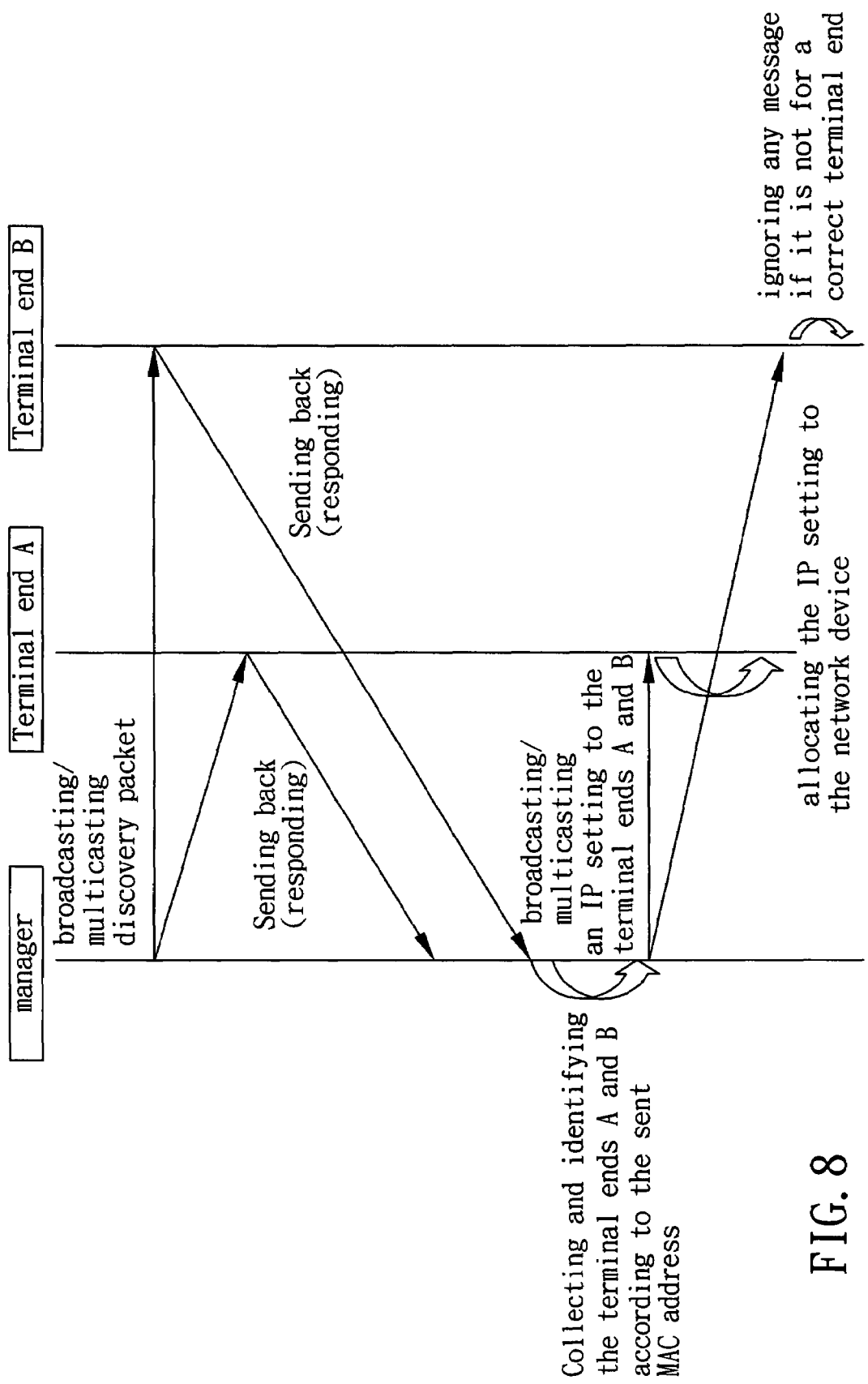
FIG. 8 is a schematic view showing that the NMS is used to allocate the IP setting to the network device according to the method for discovering the network device in the preferred embodiment of the present invention.

For example, referring now to FIG. 8, a schematic view showing that the NMS (i.e. a manager) is used to allocate IP setting to the network device (including a terminal end A and a terminal end B) according to the method for discovering the network device in the preferred embodiment of the present invention is illustrated. Firstly, the manager transmits the discovery packet to all of the terminal ends A and B in a broadcast or multicast manner as shown in the flowchart of FIG. 3. Then, each of the terminal ends A and B respectively sends back the corresponding MAC address and device information to the manager as shown in the flowchart of FIG. 6, wherein the terminal end A or the terminal end B may not obtain only one effective IP address. After this, the manager stores the MAC address and device information from the terminal ends A and B to the device information table of the manager as shown in the flowchart of FIG. 4, so that the manager will identify each of the terminal ends A and B according to the MAC address in the device information table for managing the terminal ends A and B. For instance, the identification of the terminal ends A and B has been identified according to the corresponding MAC address, so that the manager will be able to execute a procedure for allocating an IP address. Furthermore, the manager can broadcast/multicast a management packet including an IP setting command, wherein the management packet may comprise the MAC address of the terminal end A as an identification thereof. Thereby, when the terminal end A receives the management packet, the terminal end A can confirm that the management packet is exactly for the terminal end A according to the MAC address in the management packet. Then, a procedure of setting the IP address of the terminal end A will be executed according to the IP setting command in the management packet. Conversely, if the terminal end B receives the same management packet as described above, the terminal end B can confirm that the management packet is exactly not for the terminal end B according to the MAC address in the management packet. Therefore, the terminal end B will ignore (i.e. discard) any message included in the management packet.

Alternatively, in another preferred embodiment of the present invention, another procedure for managing a network device is also feasible according to the method for discovering the network device by means of identifying the identification of each of the network devices via its corresponding MAC address (but not its IP address), such as changing the default login information of one of the network devices, updating a firmware of one of the network devices, and etc. The procedure for managing a network device as described above is only the alternatively extensible preferred embodiment of the present invention, but is not the subject matter of the present invention, so that the detailed description thereof will be omitted hereinafter.

As described above, in comparison with the traditional method, the method for discovering the network device according to the preferred embodiment of the present invention has the following advantages:

(1) The method of the present invention can finish a discovery procedure without any IP address. Because the method thereof is executed in the MAC layer, the execution efficiency of the discovery procedure can be enhanced.

(2) The method of the present invention only uses the MAC address of the network device as identification thereof for a network communication purpose, so that the related network management can be substantially simplified, and the NMS will not be confused due to ignoring the same predetermined default IP address between the network devices.

(3) The method of the present invention is advantageous to reduce the costs and the load of related hardware and software (such as DHCP server and services) derived from additionally processing an IP allocation procedure in the traditional method.

(4) The method of the present invention supports the broadcast mode or the multicast mode, so as to provide more application flexibility for the discovery procedure of the present invention to be normally executed under various different IP network environments.

(5) The method of the present invention doesn't need periodic searching for a new generated IP in the network system, so as to maintain and enhance the operation efficiency of the network system.

(6) Once the discovery procedure of the network device is finished according to the method of the present invention, the MAC address of each of the network device and related device information thereof will be included in a packet data unit (PDU) of a packet. In this manner, the utility rate of the network bandwidth can be substantially saved, and the network efficiency can be enhanced.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for discovering a network device, wherein a discovery procedure is executed via a Network Management Server (NMS) to discover at least one of the other network devices within a network system, the method executed by the NMS comprising:

(A) starting the discovery procedure;

(B) generating a discovery packet which comprises a command for requesting a network device to send back a corresponding Media Access Control (MAC) address;

(C) transmitting the discovery packet;

(D) receiving a response packet which is sent back by the network device corresponding to the discovery packet;

(E) analyzing the response packet for collecting the MAC address in the response packet; and (F) updating a device information table according to the MAC address for identifying the network device;

wherein the step (E) further comprises the following steps:

(E1) checking if a signature included in the response packet is valid: if yes, go to step (E2); if not, go to step (E5);

(E2) checking if a protocol version included in the response packet is valid; if yes, go to step (E3); if not, go to step (E5);

(E3) checking if an interface version included in the response packet is valid; if yes, go to step (E4); if not, go to step (E5);

(E4) collecting the MAC address included in the response packet, and going to the step (F); and (E5) discarding the response packet.

2. The method for discovering the network device of claim 1, wherein the discovery procedure is executed in a communication protocol of a MAC layer, and wherein when the step (E) of analyzing the response packet is executed, an IP address in the response packet is omitted.

3. The method for discovering the network device of claim 1, further comprising a step between the steps (A) and (B), the step comprising:

(A1) clearing a content of the device information table.

4. The method for discovering the network device of claim 1, further comprising a step between the steps (B) and (C), the step comprising:

(B1) checking if the network system is ready to transmit the discovery packet; if yes, go to the step (C); if not, generating a transmission fault announcement.

5. The method for discovering the network device of claim 1, wherein the method executed by the network device further comprises:

(1) receiving the discovery packet;

(2) analyzing the discovery packet;

(3) generating the response packet according to the discovery packet which comprises the MAC address of the network device; and (4) sending the response packet.

6. The method for discovering the network device of claim 5, wherein the step (2) further comprises a step, and the step comprises:

(2a) checking if a signature included in the discovery packet is valid; if yes, go to step (2b); if not, go to step (2f);

(2b) checking if a protocol version included in the discovery packet is valid; if yes, go to step (2c); if not, go to step (2f);

(2c) checking if a family type included in the discovery packet is valid; if yes, go to step (2d); if not, go to step (2f);

(2d) checking if a command included in the discovery packet is valid; if yes, go to step (2e); if not, fill a fault status into the response packet and then go to the step (4);

(2e) filling at least one device information of the network device including the MAC address into the response packet, and then go to step (4); and (2f) discarding the discovery packet.

7. A method for discovering a network device, comprising:

sending a discovery packet from a Network Management Server (NMS);

receiving the discovery packet by at least one network device, and said network device generating a response packet corresponding the discovery packet for sending the response packet, wherein the response packet comprises a Media Access Control (MAC) address of the network device; and said NMS receiving the response packet for collecting the MAC address while ignoring an IP address in the response packet, and updating a device information table according to the MAC address for identifying the network device wherein a process for sending the discovery packet executed by the NMS comprises:

(A) starting the discovery procedure;
(B) generating the discovery packet which comprises a command for requesting the network device to send back the corresponding Media Access Control (MAC) address; and
(C) transmitting the discovery packet;

wherein a process for collecting the MAC address comprises:

(E1) checking if a signature included in the response packet is valid; if yes, go to step (E2); if not, go to step (E5);
(E2) checking if a protocol version included in the response packet is valid; if yes, go to step (E3); if not, go to step (E5);
(E3) checking if an interface version included in the response packet is valid; if yes, go to step (E4); if not, go to step (E5);
(E4) collecting the MAC address included in the response packet, and updating the device information table according to the MAC address for identifying the network device; and
(E5) discarding the response packet.

8. The method for discovering the network device of claim 7, further comprising a step between the steps (A) and (B), the step comprising:
(A1) clearing a content of the device information table.

9. The method for discovering the network device of claim 7, further comprising a step between the steps (B) and (C), the step comprising:
(B1) checking if the network system is ready to transmit the discovery packet; if yes, go to the step (C); if not, generating a transmission fault announcement.

10. The method for discovering the network device of claim 7, wherein the process for generating the response packet executed by the network device further comprises:
(a) checking if a signature included in the discovery packet is valid; if yes, go to step (b); if not, go to step (f);
(b) checking if a protocol version included in the discovery packet is valid; if yes, go to step (c); if not, go to step (f);
(c) checking if a family type included in the discovery packet is valid; if yes, go to step (d); if not, go to step (f);
(d) checking if a command included in the discovery packet is valid; if yes, go to step (e); if not, fill a fault status into the response packet and then send the response packet;
(e) filling at least one device information of the network device including the MAC address into the response packet, and then send the response packet; and
(f) discarding the discovery packet.

11. A method for discovering a network device, wherein a discovery procedure is executed via a Network Management Server (NMS) to discover at least one of other network devices within a network system, the method executed by the network device comprising:
(1) receiving a discovery packet which comprises a command for requesting the network device to send back a corresponding Media Access Control (MAC) address;
(2) analyzing the discovery packet;
(3) generating a response packet according the discovery packet which comprises the MAC address of the network device; and
(4) sending the response packet;

wherein the discovery procedure executed by the NMS comprises:

(A) starting the discovery procedure;
(B) generating the discovery packet which comprises the command for requesting the network device to send back the corresponding Media Access Control (MAC) address;
(C) transmitting the discovery packet;
(D) receiving the response packet which is sent back by the network device corresponding to the discovery packet;
(E) analyzing the response packet for collecting the MAC address in the response packet; and
(F) updating a device information table according to the MAC address for identifying the network device;

wherein step (E) further comprises the following steps:
(E1) checking if a signature included in the response packet is valid; if yes, go to step (E2): if not, go to step (E5);
(E2) checking if a protocol version included in the response packet is valid; if yes, go to step (E3); if not, go to step (E5);
(E3) checking if an interface version included in the response packet is valid if yes go to step (E4); if not, go to step (E5);
(E4) collecting the MAC address included in the response packet, and going to the step (F); and
(E5) discarding the response packet.

12. The method for discovering the network device of claim 11, wherein the step (2) further comprises:
(2a) checking if a signature included in the discovery packet is valid; if yes, go to step (2b); if not, go to step (2f);
(2b) checking if a protocol version included in the discovery packet is valid; if yes, go to step (2c); if not, go to step (2f);
(2c) checking if a family type included in the discovery packet is valid; if yes, go to step (2d); if not, go to step (2f);
(2d) checking if a command included in the discovery packet is valid; if yes, go to step (2e); if not, fill a fault status into the response packet and then go to the step (4);
(2e) filling at least one device information of the network device including the MAC address into the response packet, and then go to step (4); and
(2f) discarding the discovery packet.

13. The method for discovering the network device of claim 11, wherein the discovery procedure is executed in a communication protocol of a MAC layer, and wherein when the step (E) of analyzing the response packet is executed, an IP address in the response packet is omitted.

14. The method for discovering the network device of claim 11, further comprising a step between the steps (A) and (B), the step comprising:
(A1) clearing a content of the device information table.

15. The method for discovering the network device of claim 11, wherein the response packet comprises a Data Link Layer (DLL) Header field, an IP header field, a User Datagram Protocol (UDP) header field, a version field, a MAC information field, a control code field, and a control data field.

* * * * *